(12) United States Patent
Cook

(10) Patent No.: US 7,133,515 B1
(45) Date of Patent: Nov. 7, 2006

(54) SUBSCRIBER CONTROL OF BUSY LINE INTERRUPT AND LINE TREATMENT CODES

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 450 days.

(21) Appl. No.: 10/218,722

(22) Filed: Aug. 14, 2002

(51) Int. Cl.
*H04M 3/42* (2006.01)
(52) U.S. Cl. ............................ 379/208.01; 379/211.01
(58) Field of Classification Search ........... 379/208.01, 379/211.01, 88.18, 211.02, 231, 234
See application file for complete search history.

(56) References Cited

U.S. PATENT DOCUMENTS

| | | | |
|---|---|---|---|
| 5,526,415 A | 6/1996 | Wakamoto | |
| 6,208,718 B1 | 3/2001 | Rosenthal | |
| 6,208,726 B1 * | 3/2001 | Bansal et al. | 379/208.01 |
| 6,700,972 B1 * | 3/2004 | McHugh et al. | 379/265.13 |
| 6,718,026 B1 * | 4/2004 | Pershan et al. | 379/211.01 |

OTHER PUBLICATIONS

US 5,905,788, 05/1999, Bauer et al. (withdrawn)

* cited by examiner

*Primary Examiner*—Bing Q. Bui

(57) ABSTRACT

The present invention deploys an intelligent voice response (IVR) unit to interface between the subscriber and the operational support system of the telephone system. After proper authentication, the subscriber can access control over certain predefined behaviors associated with the subscribed line connection, resulting in improved utility and functionality for the subscriber as well as improved busy line interrupt actions.

19 Claims, 4 Drawing Sheets

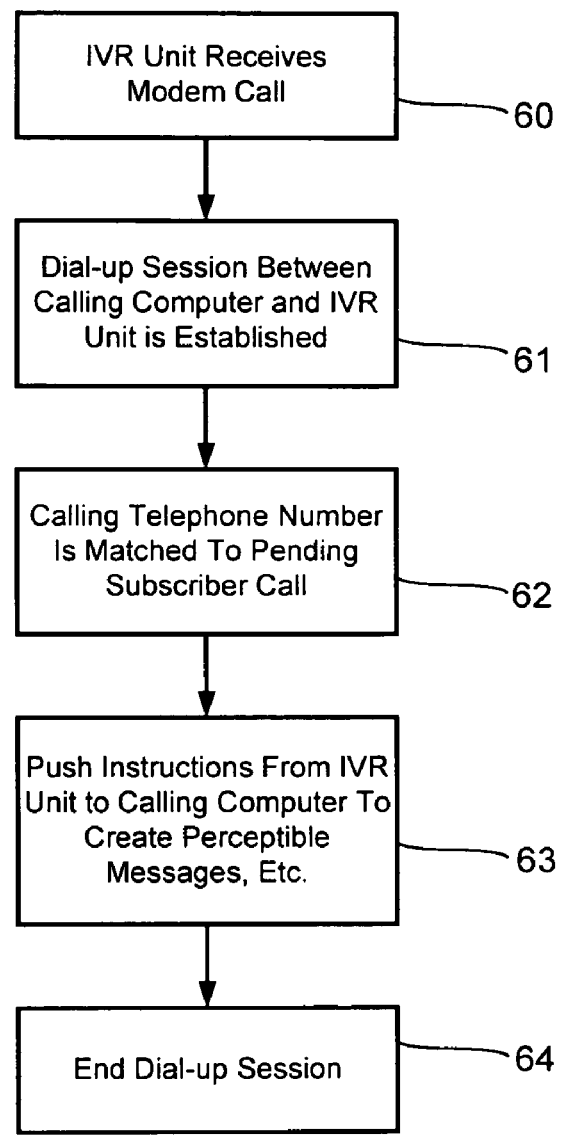

SUBSCRIBER CONTROL OF BUSY LINE INTERRUPT AND LINE TREATMENT CODES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to remote control of a telephone line, and, more specifically, to use of an intelligent voice response unit to allow a subscriber to implement control actions over their subscribed telephone line connection, such as issuing a busy line interrupt command or other line treatment commands.

Telephone subscribers have customarily not had much control over the behavior or settings of their subscribed telephone line connection. Examples of existing controls include the activation and deactivation of optional features such as call waiting, call forwarding, call park, busy line callback, and automatic number identification (i.e., caller ID). However, other actions such as a busy line interrupt (BLI) have typically continued to require intervention of a telephone operator. Other functions available only to an operator or other telephone company personnel include various treatment codes, such as a re-direct code that causes any call placed from a particular subscriber line to be directed to a predetermined telephone number (e.g., the number of the telephone company billing office when a subscriber's billing account is delinquent). Such treatment codes are implemented within an operational support system (OSS) which comprises a private computer network operated by the telephone carrier which is interfaced to and controls the switches and service control points that handle calls within the public telephone network (making them inaccessible to subscribers).

U.S. Pat. No. 5,905,788, issued to Bauer et al, proposes an automatic system for allowing a subscriber away from home that encounters a busy signal when calling home to interrupt the existing call. During receipt of a busy signal, the subscriber dials an interrupt code that is forwarded to the interexchange carrier (IXC) which verifies the validity of the code and then signals the end office of the local exchange carrier (LEC) to interrupt the call. However, the proposed system in Bauer et al has disadvantages from the standpoint of the LEC because the LEC directly is responsible for the subscriber line performance and it cannot itself verify the authenticity of an interrupt request. Furthermore, in the event that the subscriber line is busy because of a computer dial-up session on the line, then even after the call is interrupted the away-from-home subscriber may still fail to complete a phone call to the line because the computer may immediately re-dial following the interrupt or the computer may auto-answer the operator's call.

U.S. Pat. No. 6,208,718, issued to Rosenthal, discloses measures to handle re-dial attempts by a modem after an operator-initiated line interrupt. A signal recognizable by the modem is transmitted by the telephone network for indicating to the modem that an emergency interrupt took place, so that re-dialing attempts by the modem can be prevented. However, a specially modified modem is required to implement this technique.

Thus, it would be desirable to enable a subscriber (or other authorities) to manage a greater range of behaviors of a subscribed telephone line, whether remotely from another subscriber line or from the subscribed line itself. Further, it would be desirable to ensure the completion of a voice telephone call after interrupting a computer data call on the subscriber line without requiring modifications to a modem.

SUMMARY OF THE INVENTION

The present invention deploys an intelligent voice response (IVR) unit to interface between the subscriber and the operational support system of the telephone system. After proper authentication, the subscriber can access control over certain predefined behaviors associated with the subscribed line connection, resulting in improved utility and functionality for the subscriber as well as improved busy line interrupt actions. As used herein, "subscriber" means the parties responsible for bill payments associated with the telephone line, family members or others authorized by a subscriber (e.g. by providing them with an ID and password), and other authorities (e.g., law enforcement personnel).

In one aspect of the invention, a method is provided for control by a subscriber of a subscribed line connection within a telephone network from a telephone terminal. The telephone network includes a public voice network portion and a private operational support system portion. The subscriber connects from the telephone terminal to an intelligent voice response (IVR) unit, the IVR unit being connected to the voice network portion and the private operational support system portion. The subscriber is authenticated by supplying a private code from the subscriber to the IVR unit. The subscriber indicates a desired subscriber line action to the IVR unit. If the subscriber is authorized to obtain the desired subscriber line action, then the IVR unit issues a configuration command within the private operational support system portion for implementing the desired subscriber fine action within the public voice network portion.

BRIEF DESCRIPTION OF THE DRAWINGS

FIG. 5 is a flowchart showing a method of communicating between a computer modem and the IVR unit following a busy line interrupt.

DETAILED DESCRIPTION OF PREFERRED EMBODIMENTS

Figure 1:
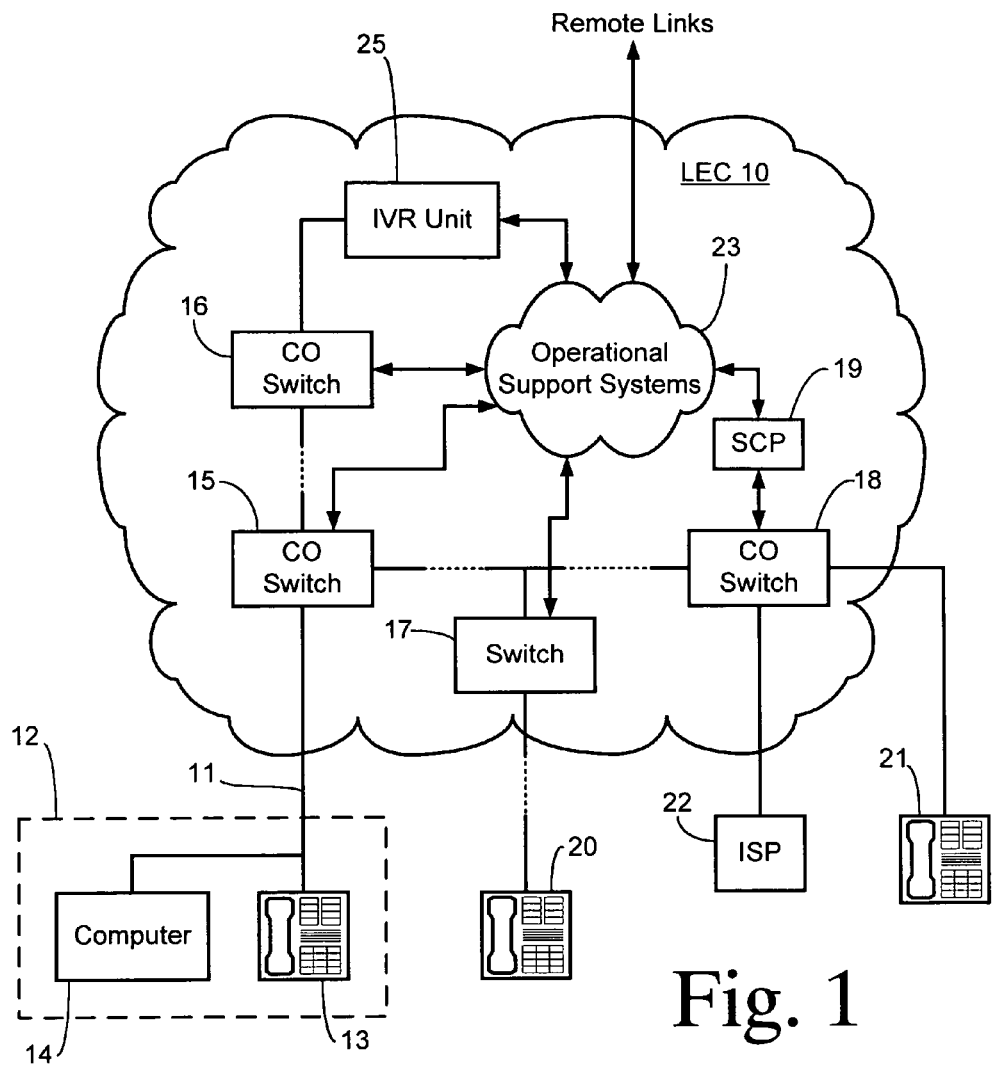
FIG. 1 is a block diagram showing the subscriber line control system of the present invention.

Referring to FIG. 1, a public switched telephone network (PSTN) includes a local exchange carrier (LEC) 10 which provides a subscribed line connection or loop 11 to a premises 12. Equipment at premises 12 coupled to line 11 includes a telephone voice instrument 13 and a computer 14. Line 11 is connected within LEC 10 to a central office switch which provides voice channels interconnected by various trunk circuits with other switches and/or switching systems 16–18. A telephone terminal 20 connected to switch 17 may be directly connected with (i.e., may be a customer of) LEC 10 or may be connected to a different LEC via an inter exchange carrier (IXC). A central office switch 18 provides subscriber loops to a telephone terminal 21 and to an Internet service provider (ISP) for receiving modem dial-up calls (e.g., from computer 14). Each central office switch may have an associated service control point (SCP), such as SCP 19 connected to switch 18. As known in the art, an SCP provides call routing functions for implementing enhanced services according to routing tables, routing statements, and routing trees to determine the disposition of calls based on the dialed number, the calling number, other call information, and any treatment codes. These functions may also be included within a switch itself. When an SCP is present, it may communicate with its corresponding switch(es) using a conventional signaling system (not shown) such as an SS7 system.

Each switch or its associated SCP is further connected to an operational support system (OSS) 23 which controls configuration and/or provisioning of SCP and switch resources in the public voice network. OSS 23 is a private computer network within LEC 10 which handles FCAPS (fault, configuration, accounting, performance, and security) functions, and typically is built of geographically distributed sub-blocks. Each sub-block is connected to other sub-blocks and to its controlled SCP and switch elements by private high-speed links (e.g. optical fiber or LAN cabling). OSS 23 may typically employ TCP/IP and other protocols for its communications.

An intelligent voice response (IVR) unit 25 is connected to OSS 23 and to the voice network portion of the PSTN via switch 16. Thus, IVR unit 25 provides an interface for a subscriber/requestor at a voice telephone station to certain operational capabilities (i.e., configurations) that would otherwise require operator intervention in order to be accessed. An access code or a direct telephone number is dialed by the subscriber in order to connect with IVR unit 25, and once IVR unit 25 authenticates the subscriber and checks for authorization for a requested line action it initiates the requested action via OSS 23 and/or the voice network portion.

Figure 2:
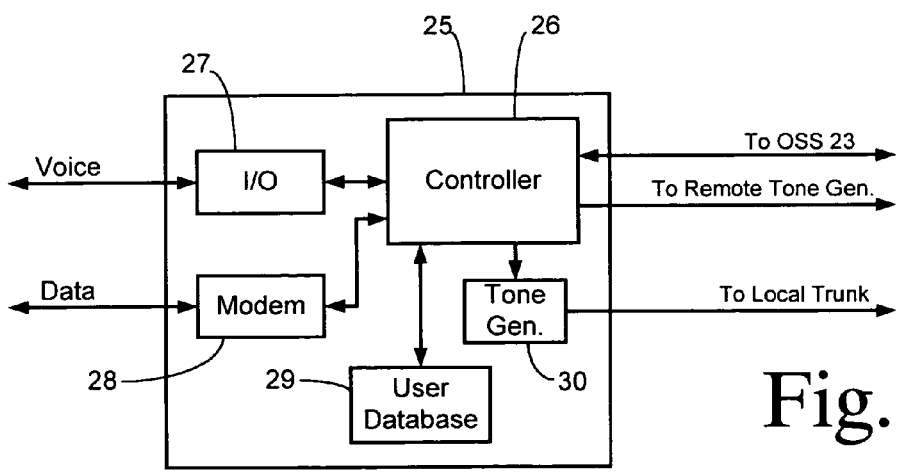
FIG. 2 is a block diagram showing the IVR unit in greater detail.

As shown in FIG. 2, IVR unit 25 includes a controller 26 connected to OSS 23. An input/output interface 27 couples controller 26 to a voice channel for communicating with a subscriber (e.g., receiving DTMF tones or spoken commands from the subscriber and providing synthesized speech feedback to the subscriber). As described below, IVR unit 25 may also communicate via a modem 28 with a computer following a busy line interrupt. A separate data line (i.e., dial-in telephone number) may be provided or IVR unit 25 may switch data calls internally to modem 28 if a dedicated data line is not provided.

Controller 26 is connected to a user database 29 which maintains security information such as subscriber ID's, private access codes or passwords assigned to each subscriber, and types of actions that each subscriber or other user is authorized to initiate. Database 29 is administered by LEC 10 in conjunction with each subscriber and is preferably organized according to the telephone numbers of each subscribed line connection. With respect to each telephone number, there may be a main subscriber or user having authorization to all available functions including the ability to create subordinate user ID's and passwords with the ability to access some or all of the available functions. In addition, there may be ID's permitted to obtain certain functions for all telephone numbers or groups of telephone numbers (e.g., law enforcement or public safety personnel for interrupting calls in emergencies).

Various line treatment codes and other functions controlled by OSS 23 can be accessed by IVR unit 25 via the direction connection of controller 26 with OSS 23. A busy line interrupt, however, is executed using in-band signaling, i.e., within the voice network portion of the telephone system (as a result of the BLI function pre-dating the SS7 signaling system). A special sequence of multi-frequency tone signals (formerly initiated by an operator) must be played within the local trunk serving the interrupted subscriber line in order to signal the appropriate switch (e.g., switch 15) to interrupt a call (e.g., on line 11). If IVR unit 25 resides within the same area code as the target subscriber line, it can generate the necessary sequence itself using a tone generator 30 and then couples the sequence to a local trunk. Otherwise, it signals a remote tone generator (via OSS 23 or some other remote connection) such as another IVR unit within the appropriate area to play the necessary sequence at the local loop.

Figure 3:
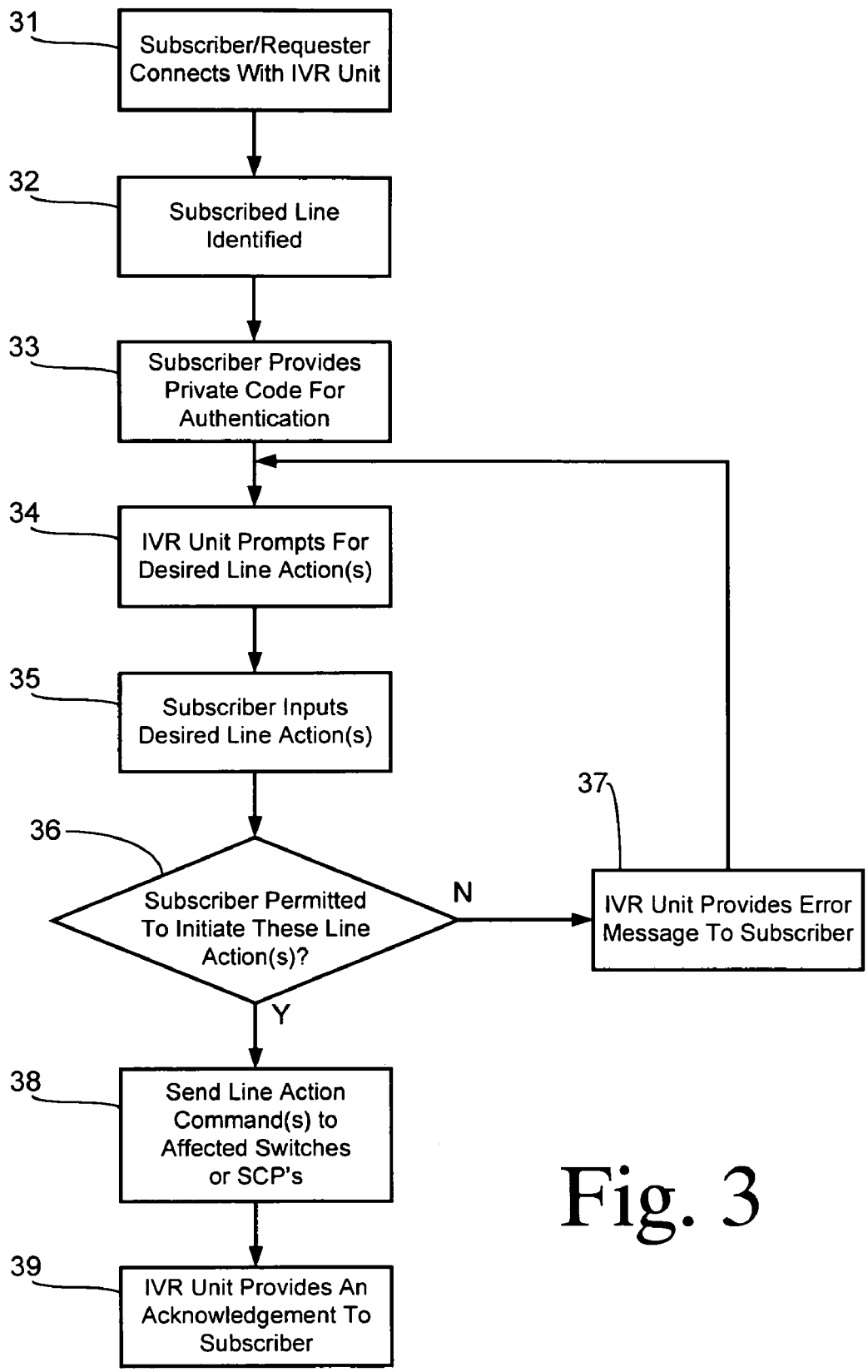
FIG. 3 is a flowchart showing a preferred method of initiating line actions by a subscriber.

One preferred method of the present invention shown in FIG. 3 begins when a subscriber/requestor connects with the IVR unit in step 31. In the case of a subscriber attempting a phone call to home (i.e., the subscribed line) from a remote telephone terminal and getting a busy signal, their connection with the IVR unit could be obtained by dialing an access code for requesting a busy line interrupt during the playing of the busy signal (i.e., without hanging up) so that the subscriber's call is transferred to the IVR unit (assuming that the switch handling the call has the capability to listen for DTMF tones while producing the busy signal). Otherwise, the caller hangs up and then the connection can be initiated as a conventional dialed phone call to a telephone number assigned to this service.

In step 32, the subscribed line to be affected is identified. If the subscriber's call was transferred to the IVR unit, then the subscribed line is the originally dialed telephone number and the number can be provided to the IVR unit by the SS7 signaling network when the call is transferred. Otherwise, the subscriber can be prompted by the IVR unit to enter the target telephone number by the touch tone keypad. In step 33, the subscriber is prompted to provide a private code (e.g., user ID and password) for authentication (by input using the touch tone keypad or by spoken voice, depending on the preference of the subscriber and the capabilities of the IVR unit). If the private code is recognized as valid within the user database, then the IVR unit prompts the subscriber for the desired line action(s) in step 34. In step 35, the subscriber inputs their desired line action(s), which may include the type of action and any parameters needed to carry out the action. For instance, one type of line action is to set a treatment code corresponding to the line that causes any attempted calls initiated from the treated line to be directed to a predetermined telephone number. In one embodiment, the line action may cause the predetermined telephone number to default to the number associated with the IVR unit. In another embodiment, the line action may allow the subscriber to input a telephone number to which subsequent calls will be directed and a time duration for which the treatment code remains active.

In step 36, the IVR unit checks whether the requested line actions are permitted to the particular subscriber (e.g., whether this user is allowed to force all outgoing calls from the subscribed line to a predetermined telephone number). If not authorized, then the IVR unit provides an error message to the subscriber in step 37 and a return is made to step 34.

As an alternative to steps 36 and 37, the IVR unit could provide dynamic menu prompts to the subscriber based on the corresponding authorizations so that only those actions that are available to the particular subscriber are presented to them.

In step 38, line action commands corresponding to the desired line actions are sent via the OSS or the voice network portion (depending upon the particular line action) to the affected switch(es). Once the desired line actions are set up, the IVR unit provides an acknowledgement message to the subscriber in step 39.

Figure 4:
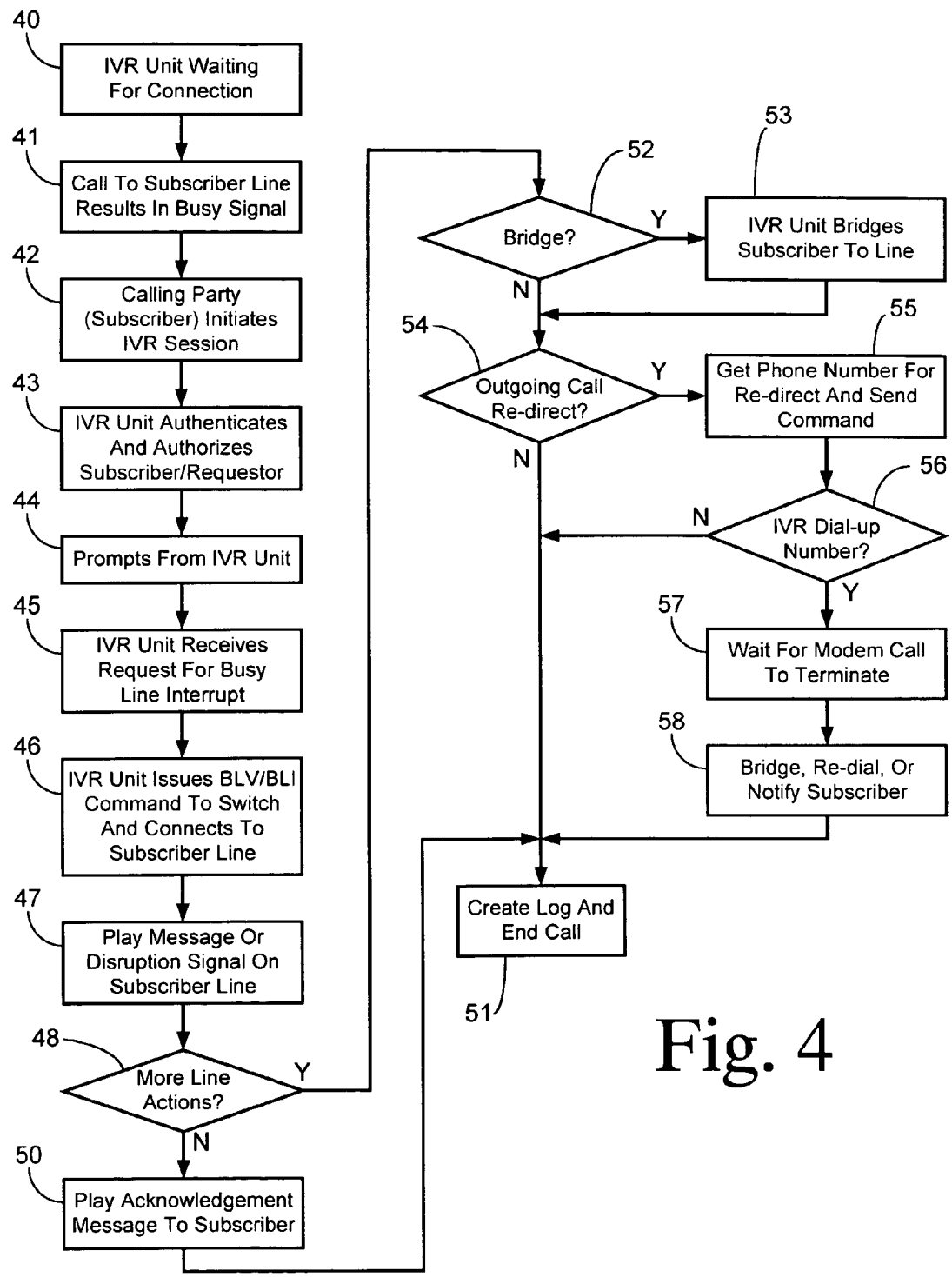
FIG. 4 is a flowchart showing a preferred method of performing a busy line interrupt in greater detail.

A detailed embodiment of the present invention for handling a busy line interrupt (BLI) action is shown in FIG. 4. The IVR unit is waiting for a subscriber to connect with it in step 40. In step 41, a subscriber gets a busy signal while calling their home or other subscribed line. In the event that the subscriber urgently wants to complete a call to the subscribed line and desires to interrupt the existing call, then they initiate a connection session with the IVR unit in step 42. The subscriber is authenticated and authorized by the IVR unit in step 43.

The IVR unit prompts the subscriber for desired line actions in step 44, and then receives a request from the subscriber to initiate a BLI action in step 45. The subscriber request may also identify actions to be taken subsequent to the interruption such as bridging calls together or setting a line treatment code to force any outgoing call from the subscriber line to a predetermined number (e.g., the telephone number from which the subscriber is calling or the telephone number of the IVR unit).

In step 46, the IVR unit, either directly or indirectly, plays a busy line verification/busy line interrupt (BLV/BLI) command sequence to the central office switch serving the subscribed line. Preferably, the IVR unit may obtain a direct voice connection to the subscriber line as a result of the command. In step 47, the IVR unit plays an audio message (e.g., "Please wait for incoming telephone call") to alert the person that had been on the interrupted call to keep the subscribed line clear so that the subscriber can complete their call. Alternatively, the IVR unit may detect that the interrupted call was a computer data call (e.g., by sensing the presence of a modem signal). In that event, the IVR unit may transmit a disruption signal having a pattern that interferes with the modem signals to cause errors that are sensed by the modem, causing the modem to hang up its connection to the telephone line.

In step 48, the IVR unit determines whether more line actions are desired after having successfully interrupted the existing telephone call. If not, then an acknowledgement message is played to the subscriber in step 50 (e.g., "Interrupt successful; you can now dial the number"). Then a log entry is created and the call ended in step 51. The log entry may be a call detail record and/or a fault event record within the OSS showing that the interrupt event was a customer requested action. The IVR unit may also create an audit record that details the subscriber information, time, date, and action taken. These records may support a billing system where this service is provided on a fee basis.

If more line actions are to be taken, then a check is made in step 52 to determine whether the subscriber has requested to be directly bridged to the subscribed line after the BLI action. If so, then the IVR unit retains both of its connections to the subscriber and to the subscribed line and then executes a bridging action to connect the two destinations.

In step 54, a check is made to determine whether a line treatment code is to be set in order to re-direct any subsequent outgoing calls on the subscriber line. If not, then log entries are created and the call ended in step 51. Otherwise, the IVR unit determines the destination telephone number to be used for re-directs in step 55 and forwards the necessary line treatment commands to any affected switches and/or service control points via the OSS. In particular, such commands may be directed to altering routing tables, routing statements, or routing trees within the switches and/or SCP's.

The destination telephone number may, for example, default to the telephone number from which the subscriber initiated the BLI action or the telephone number of the IVR unit. If a computer modem call was detected (e.g., by a modem sensing circuit in the IVR unit), the default telephone number of the IVR unit may comprise a dedicated dial-up connection of the IVR unit so that subsequent automatic dialing out by the computer will be intercepted by the IVR unit. Alternatively, the telephone number may be specified by input keystrokes by the subscriber (e.g., a parent wants all calls placed by a baby-sitter to go to a certain destination where the parent will be).

A check is made in step 56 to determine whether the re-direct destination telephone number corresponds to the dial-up port of the IVR unit. If not, then log entries are created and the call ended in step 51. Otherwise, the handling of the subscriber's call to the IVR unit waits in step 57 for the redial attempt of the computer at the subscriber's premises to be made to the IVR unit and then for that data call to terminate. In step 58, the IVR unit may then bridge the subscriber to the cleared subscribed line, re-dial the subscribed line if necessary prior to bridging the calls, or merely provide an acknowledgement message to the subscriber that a successful data session has concluded between the IVR unit and the computer. Then log entries are created and the call is ended in step 51.

FIG. 5 shows a preferred embodiment of the data session between the IVR unit and the computer at the subscriber premises after a line interrupt. In step 60, the IVR unit receives a call from the computer modem (e.g., a re-directed call that was intended by the computer modem to go to an ISP). A dial-up networking session is established between the calling computer and the IVR unit in step 61. If not already known, the data call may be matched with the associated subscriber call by noting the calling telephone number using automatic number identification in step 62.

In step 63, computer instructions are pushed (i.e., "hurled") from the IVR unit to the calling computer. These instructions may cause the computer to create perceptible audio or visual messages to the computer user to alert them to the urgent need to clear the subscribed telephone line and to await an incoming call from the subscriber. The instructions may also include modem instructions for resetting or otherwise temporarily disabling the modem. The instructions may comprise self-executing applets (e.g., Java bytecode) so that the perceptible messages are displayed without requiring user interaction. After pushing the instructions to the calling computer, the dial-up session is ended at step 64 (and the waiting step 57 in FIG. 4 expires).

The present invention has significant applications not involving a busy line interrupt. For example, a subscriber may dial the IVR unit from their subscribed line prior to leaving children with a baby-sitter in order to initiate a line treatment that forces any phone call placed by the baby-sitter to be directed to the subscriber's mobile telephone.

The IVR unit of the present invention is similar to units employed in phone card or calling card systems used for pre-paying for long distance telephone service. A phone card user dials a special telephone number to an IVR unit and enters a personal identification number (PIN). Validated requests in a phone card system (e.g., minutes or funds are credited to the phone card) create system messages that appear like an automated operator assisted call to the network switching elements. The present invention may use a similar identification and authorization process. Furthermore, the present invention can be added as an option to a phone card system.

What is claimed is:

1. A method for subscriber control of a subscribed line connection within a telephone network from a telephone terminal, said telephone network including a public voice network portion and a private operational support system portion, said method comprising the steps of:

said subscriber connecting from said telephone terminal to an intelligent voice response (IVR) unit, said IVR unit being connected to said public voice network portion and said private operational support system portion;

authenticating said subscriber by supplying a private code from said subscriber to said IVR unit;

said subscriber indicating a desired subscriber line action to said IVR unit;

if said subscriber is authorized to obtain said desired subscriber line action, then said IVR unit issuing a configuration command within said private operational support system portion for implementing said desired subscriber line action within said public voice network portion.

2. The method of claim 1 wherein said telephone terminal connects to said public voice network portion by other than said subscribed line connection.

3. The method of claim 1 wherein said desired subscriber line action is comprised of a busy line interrupt and wherein said IVR unit further initiates an interrupt command within said public voice network portion.

4. The method of claim 3 wherein said telephone terminal connects to said voice network portion by other than said subscribed line connection, and wherein after said busy line interrupt clears said subscribed line connection, said telephone terminal is bridged to said subscribed line connection.

5. The method of claim 1 wherein said desired subscriber line action is comprised of setting a line treatment code.

6. The method of claim 5 wherein said line treatment code causes a subsequent call originated from said subscribed line connection to be directed to a specified telephone number.

7. The method of claim 6 wherein said specified telephone number connects to said IVR unit.

8. The method of claim 7 wherein said IVR unit includes a modem for responding when a call to said specified telephone number is made by a computer coupled to said subscribed line connection, said IVR unit sending computer instructions via said modem to said computer in response to said desired subscriber line action.

9. The method of claim 8 wherein said computer instructions create a perceptible message corresponding to said desired subscriber line action.

10. The method of claim 9 wherein said desired subscriber line action comprises a busy line interrupt and wherein said perceptible message comprises an alert that a previous call on said subscriber line connection was interrupted under control of said subscriber.

11. The method of claim 6 wherein said telephone terminal connects to said voice network portion by other than said subscribed line connection, and wherein said specified telephone number corresponds to said telephone terminal.

12. The method of claim 6 wherein said specified telephone number is supplied by said subscriber to said IVR unit.

13. The method of claim 1 wherein said subscriber connects from said telephone terminal to said IVR unit by dialing a predetermined telephone number other than a telephone number corresponding to said subscribed line connection.

14. The method of claim 1 wherein said subscriber connects from said telephone terminal to said IVR unit by dialing a predetermined transfer code while receiving a busy signal in response to an attempt to dial a telephone number corresponding to said subscribed line connection.

15. The method of claim 1 wherein said IVR unit is connected in a local exchange carrier (LEC) network that also includes said subscribed line connection.

16. A method of controlling subscriber line actions for a subscriber line in a telephone system without operator intervention, said telephone network including a public voice network portion and a private operational support system portion, said method comprising the steps of:

creating a session between said private operational support system portion and a requester within said public voice network portion;

authenticating said requestor;

identifying a subscriber line action desired by said requestor for altering a corresponding behavior of said subscriber line; and issuing a corresponding command within said private operation support system portion if said authenticated requestor is authorized to obtain said identified subscriber line action.

17. The method of claim 16 wherein said identified subscriber line action is comprised of a busy line interrupt.

18. The method of claim 16 wherein said identified subscriber line action is comprised of bridging said requestor with said subscriber line.

19. The method of claim 16 wherein said identified subscriber line action is comprised of re-directing outgoing calls on said subscriber line to a specified telephone number.

* * * * *